US012253039B2

United States Patent
Okada et al.

(10) Patent No.: US 12,253,039 B2
(45) Date of Patent: Mar. 18, 2025

(54) CONTROLLER FOR HYDROGEN ENGINE

(71) Applicant: TOYOTA JIDOSHA KABUSHIKI KAISHA, Toyota (JP)

(72) Inventors: Yoshihiro Okada, Susono (JP); Makoto Yamazaki, Gotenba (JP); Toshiki Mikami, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/623,671

(22) Filed: Apr. 1, 2024

(65) Prior Publication Data

US 2024/0337226 A1    Oct. 10, 2024

(30) Foreign Application Priority Data

Apr. 7, 2023 (JP) .................................. 2023-062658

(51) Int. Cl.
F02D 41/14  (2006.01)
(52) U.S. Cl.
CPC ....... F02D 41/1454 (2013.01); F02D 41/146 (2013.01); F02D 2200/024 (2013.01)
(58) Field of Classification Search
CPC ............... F02D 41/1454; F02D 41/146; F02D 2200/024
See application file for complete search history.

(56) References Cited

U.S. PATENT DOCUMENTS

| | | | |
|---|---|---|---|
| 9,903,293 B2 * | 2/2018 | Nakasaka | F02D 35/023 |
| 10,502,114 B2 * | 12/2019 | Nakano | F01N 3/0814 |
| 2017/0016872 A1 * | 1/2017 | Nakasaka | G01M 15/08 |
| 2022/0341354 A1 * | 10/2022 | Gelso | F01N 3/208 |
| 2023/0101071 A1 * | 3/2023 | Chiera | F02D 41/3047 |
| | | | 60/274 |

FOREIGN PATENT DOCUMENTS

| | | | | |
|---|---|---|---|---|
| JP | 2006046075 A | * | 2/2006 | |
| JP | 2006046076 A | * | 2/2006 | |
| JP | 2008-025528 A | | 2/2008 | |
| JP | 4581908 B2 | | 11/2010 | |
| JP | 2011-247093 A | | 12/2011 | |
| JP | 2013-185512 A | | 9/2013 | |
| WO | WO-2011011868 A1 | * | 2/2011 | ........... F02D 35/024 |
| WO | WO-2017032915 A1 | * | 3/2017 | ........... F02D 19/027 |
| WO | WO-2019211996 A1 | * | 11/2019 | ......... F02B 23/0624 |
| WO | WO-2019212009 A1 | * | 11/2019 | ................ F02B 1/02 |

* cited by examiner

Primary Examiner — Joseph J Dallo
(74) Attorney, Agent, or Firm — Finnegan, Henderson, Farabow, Garrett and Dunner, LLP

(57) ABSTRACT

A controller for a hydrogen engine that includes an in-cylinder pressure sensor and an air-fuel ratio sensor includes processing circuitry. The processing circuitry is configured to execute a process that calculates a fluctuation amount of a combustion pressure based on an output of the in-cylinder pressure sensor and a process that calculates a correction amount based on the fluctuation amount. The correction amount is used to correct a rich deviation of an output of the air-fuel ratio sensor due to unburned hydrogen in exhaust gas.

4 Claims, 3 Drawing Sheets

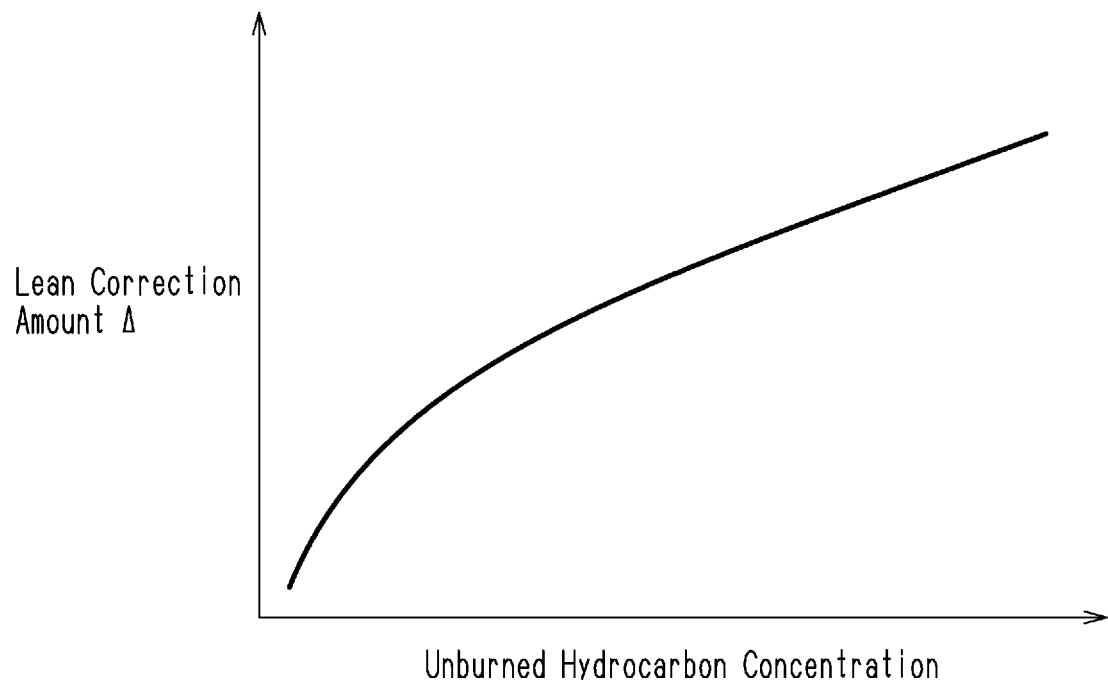

CONTROLLER FOR HYDROGEN ENGINE

BACKGROUND

1. Field

The present disclosure relates to a controller for a hydrogen engine.

2. Description of Related Art

Japanese Laid-Open Patent Publication No. 2013-185512 discloses an engine in which air-fuel ratio sensors are respectively installed upstream and downstream of a catalyst in an exhaust passage. The publication discloses that an output deviation of the air-fuel ratio sensor on the upstream side of the catalyst due to hydrogen generated during rich combustion is compensated for based on the output of the air-fuel ratio sensor on the downstream side of the catalyst.

Some hydrogen engines that use hydrogen gas as fuel include an air-fuel ratio sensor. In a hydrogen engine, hydrogen may be discharged to an exhaust passage without completely burning in a combustion chamber. Thus, in the above hydrogen engine, there is a possibility that a deviation occurs in the output of the air-fuel ratio sensor due to the influence of unburned hydrogen. In such a hydrogen engine, the output deviation of the air-fuel ratio sensor due to unburned hydrogen may be compensated by the method described in the publication. However, this requires the installation of an air-fuel ratio sensor that is not affected by the unburned hydrogen, in addition an air-fuel ratio sensor that compensates for the output deviation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a controller for a hydrogen engine including an in-cylinder pressure sensor and an air-fuel ratio sensor. The controller includes processing circuitry. The processing circuitry is configured to execute a process that calculates a fluctuation amount of a combustion pressure based on an output of the in-cylinder pressure sensor and a process that calculates a correction amount based on the fluctuation amount. The correction amount being used to correct a rich deviation of an output of the air-fuel ratio sensor due to unburned hydrogen in exhaust gas.

In this configuration, the output of the air-fuel ratio sensor due to unburned hydrogen is compensated for.

Other features and aspects will be apparent from the following detailed description, the drawings, and the claims.

BRIEF DESCRIPTION OF DRAWINGS

FIG. 4 is a graph showing the relationship between the unburned hydrogen concentration and the lean correction amount.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an embodiment of a controller for a hydrogen engine will be described in detail with reference to FIGS. 1 to 4. The hydrogen engine controlled by the controller of the present embodiment is mounted on a vehicle.

Configuration of Hydrogen Engine and Controller

Figure 1:
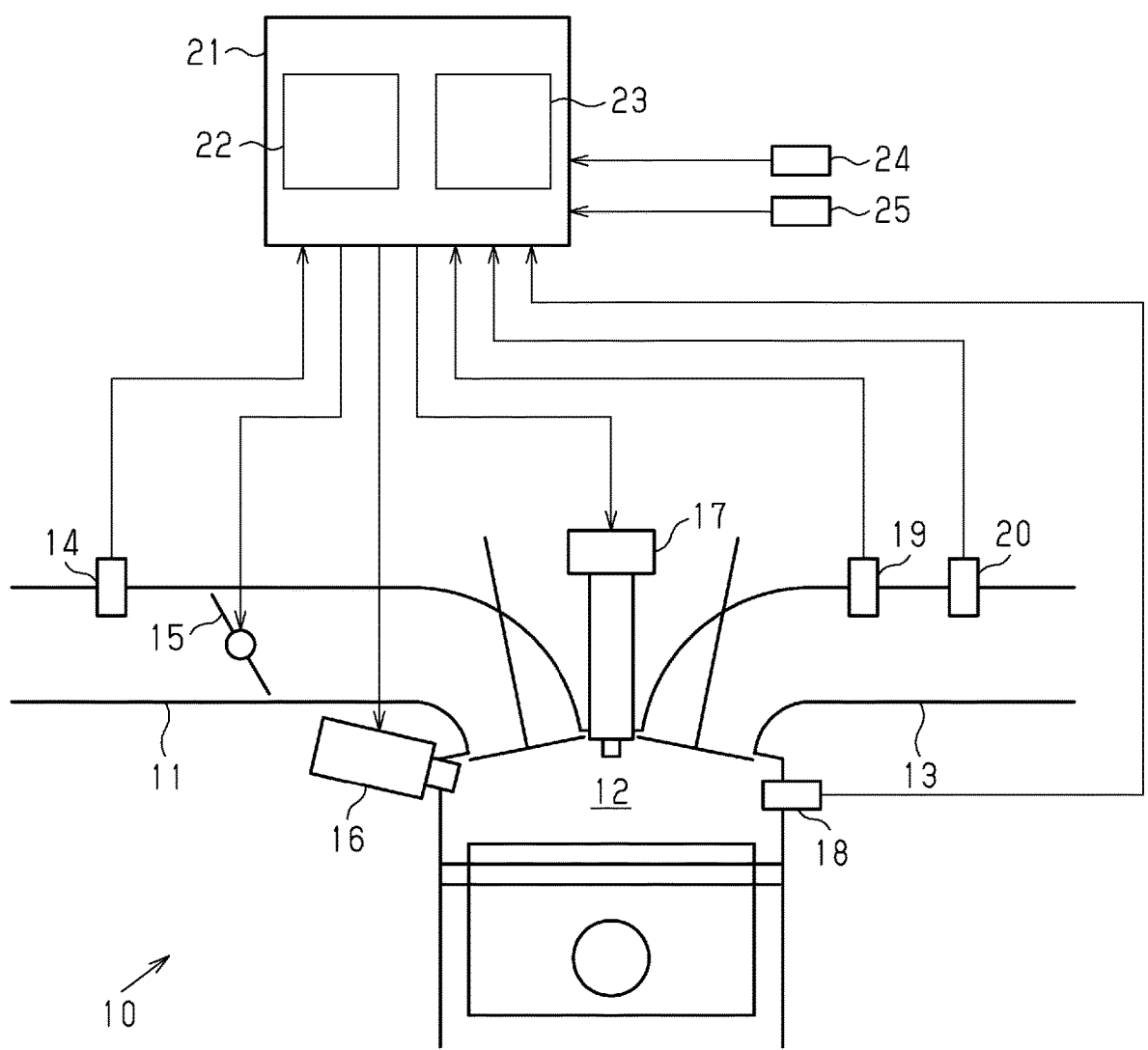
FIG. 1 is a diagram schematically showing the configuration of an embodiment of a controller for a hydrogen engine according to an embodiment.

A hydrogen engine 10 shown in FIG. 1 includes an intake passage 11, a combustion chamber 12, and an exhaust passage 13. An air flow meter 14 and a throttle valve 15 are provided in the intake passage 11. The air flow meter 14 is a sensor that detects an intake air amount GA. The throttle valve 15 is a valve for adjusting the amount of air introduced into the combustion chamber 12. The combustion chamber 12 is provided with an injector 16, an ignition device 17, and an in-cylinder pressure sensor 18. The injector 16 injects hydrogen gas into the air introduced into the combustion chamber 12 through the intake passage 11. The ignition device 17 ignites a mixture of hydrogen gas and air by spark discharge. The in-cylinder pressure sensor 18 is a sensor that detects an in-cylinder pressure P that is an internal pressure of the combustion chamber 12. A NOx sensor 19 and an air-fuel ratio sensor 20 are installed in the exhaust passage 13. The NOx sensor 19 detects the concentration of NOx (nitrogen oxide) in the exhaust gas in the exhaust passage 13. The air-fuel ratio sensor 20 is a sensor for detecting an air-fuel ratio $\lambda$ of the air-fuel mixture burned in the combustion chamber 12.

The hydrogen engine 10 is controlled by an electronic control unit (ECU) 21 as a controller. The ECU 21 includes a storage device 22 in which a program for controlling the hydrogen engine 10 is stored. Further, the ECU 21 includes processing circuitry 23 that executes a program read from the storage device 22. The outputs of the air flow meter 14, the NOx sensor 19, and the air-fuel ratio sensor 20 are input to the ECU 21. Further, outputs of sensors other than the above-described sensors, for example, a crank angle sensor 24 for detecting a crank angle and an accelerator pedal sensor 25 for detecting an accelerator pedal depression amount ACC are also input to the ECU 21. The ECU 21 calculates the engine speed NE based on the output of the crank angle sensor 24. The engine rotation speed NE is the rotation speed of the output shaft of the hydrogen engine 10.

Air-Fuel Ratio Control

The ECU 21 performs air-fuel ratio control as part of the control of the hydrogen engine 10. The air-fuel ratio control is performed through manipulation of a throttle opening degree TA which is an opening ratio of the throttle valve 15 and a hydrogen gas injection amount Q of the injector 16.

In the air-fuel ratio control, the ECU 21 first calculates a required torque TE*, which is a required value of the torque of the hydrogen engine 10, based on the accelerator pedal depression amount ACC and the engine speed NE. Next, the ECU 21 calculates a target air-fuel ratio $\lambda^*$, which is a control target value of the air-fuel ratio $\lambda$, based on the required torque TE* and the engine rotation speed NE. Subsequently, the ECU 21 determines the hydrogen-gas injection amount Q such that a torque equal to the required torque TE* is obtained. Further, the ECU 21 determines the throttle open degree TA so that the air-fuel ratio $\lambda$ becomes equal to the target air-fuel ratio $\lambda^*$. Then, the ECU 21 operates the injector 16 and the throttle valve 15 based on the determined hydrogen-gas injection amount Q and the determined throttle open degree TA to control the air-fuel ratio $\lambda$ of the hydrogen engine 10. During the control of the air-fuel ratio $\lambda$, the ECU 21 performs feedback correction of one or both of the hydrogen-gas injection amount Q and the throttle open degree TA based on the detection result of the air-fuel ratio $\lambda$ of the air-fuel ratio sensor 20.

Output Compensation of Air-Fuel Ratio Sensor 20

In the hydrogen engine 10, hydrogen remaining after combustion in the combustion chamber 12 may be discharged to the exhaust passage 13. When unburned hydrogen is contained in the exhaust gas, the output of the air-fuel ratio sensor 20 becomes a value indicating an air-fuel ratio on the rich side of the actual air-fuel ratio $\lambda$. The ECU 21 performs processing for compensating for a shift of the output of the air-fuel ratio sensor 20 to the rich side.

Figure 2:
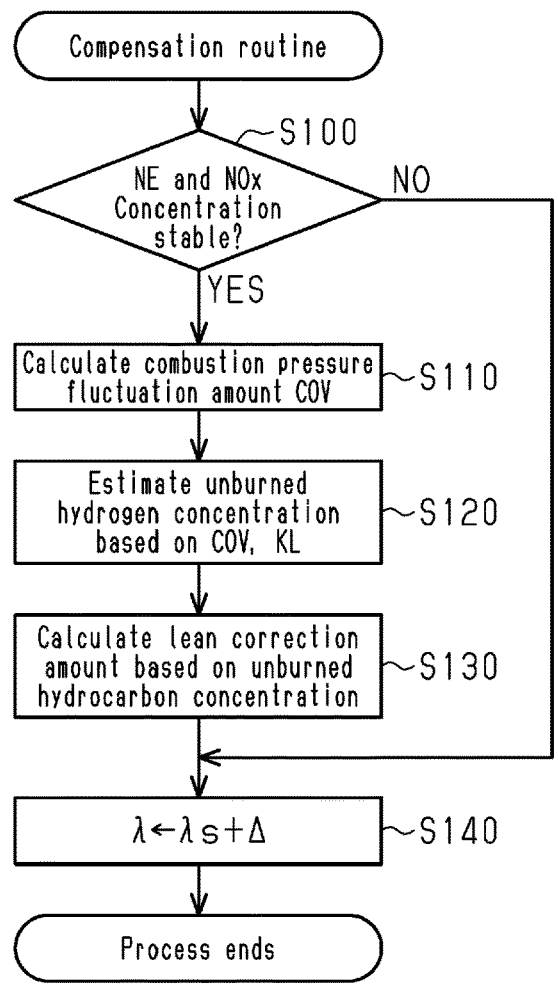
FIG. 2 is a flowchart illustrating the compensation routine executed by the controller.

FIG. 2 shows a flowchart of a compensation routine executed by the ECU 21 for compensating the outputs of the air-fuel ratio sensor 20. The ECU 21 repeatedly executes the processing of the routine at predetermined control intervals during the operation of the hydrogen engine 10. The ECU 21 performs the processing of this routine by causing processing circuitry 23 to execute a program read from the storage device 22. This routine is terminated after the processing of step S140.

When this routine is started, the ECU 21 first determines in step S100 whether the engine speed NE and the NOx concentration are stable. The ECU 21 determines that the engine speed NE and the NOx concentration are stable when both of the following requirements (A) and (B) continue for a predetermined time or more. The requirement (A) is that the amount of change in the engine speed NE calculated based on the output of the crank angle sensor 24 is less than or equal to a predetermined value. The requirement (B) is that the amount of change in the NOx concentration of the exhaust gas detected by the NOx sensor 19 is less than or equal to a predetermined value.

When the engine speed NE and the NOx concentration are stable (S100: YES), in step S110, the ECU 21 calculates a combustion pressure fluctuation amount COV of the hydrogen engine 10 based on the output of the in-cylinder pressure sensor 18. Specifically, the ECU 21 calculates the indicated mean effective pressure (IMEP) in the combustion chamber 12 based on the output of the in-cylinder pressure sensor 18 for each combustion of the hydrogen engine 10. Then, the ECU 21 obtains a mean value and a variance of the indicated mean effective pressure in a certain cycle, and calculates a ratio of the variance to the mean value as a value of the combustion pressure fluctuation amount COV.

Subsequently, in step S120, the ECU 21 calculates the unburned hydrogen concentration in the exhaust gas based on the combustion pressure fluctuation amount COV and the engine load factor KL. The engine load factor KL represents the intake air filling factor of the combustion chamber 12. Next, in step S130, the ECU 21 calculates the lean correction amount $\Delta$ based on the unburned hydrogen concentration. Then, in step S140, the ECU 21 calculates $\Delta$ he sum of the air-fuel ratio sensor value $\lambda$s and the lean correction amount $\Delta$ as the value of the air-fuel ratio $\lambda$. The air-fuel ratio sensor value $\lambda$s represents the value of the air-fuel ratio $\lambda$ calculated from the output of the air-fuel ratio sensor 20 on the assumption that there is no deviation in the output of the air-fuel ratio sensor 20.

On the other hand, when it is determined in step S100 that the engine rotation speed NE and the NOx concentration are not stable (S100: NO), the ECU 21 skips steps S110 to S130 and proceeds to step S140. In this case, the ECU 21 calculates the value of the air-fuel ratio $\lambda$ using the value of the lean correction amount $\Delta$ calculated last in the past execution of this routine.

Operation and Advantage of Present Embodiment

In step S110 of FIG. 2, the ECU 21 calculates the combustion pressure fluctuation amount COV of the hydrogen engine 10 based on the output of the in-cylinder pressure sensor 18. In step S120 of FIG. 2, the ECU 21 estimates the unburned hydrogen concentrations in the exhaust gas based on the combustion pressure fluctuation amount COV. Further, in step S130 of FIG. 2, the ECU 21 calculates the lean correction amount $\Delta$ on the basis of the unburned hydrogen concentrations. Then, in step S140 of FIG. 2, the ECU 21 performs the processing of correcting the rich deviation of the output of the air-fuel ratio sensor 20 due to the unburned hydrocarbons in the exhaust gas based on the lean correction amount $\Delta$. Thus, in step S120 and step S130, the ECU 21 performs the processing of calculating the lean correction amount $\Delta$ for correcting the rich deviation of the output of the air-fuel ratio sensor 20 due to the unburned hydrogen in the exhaust gas based on the combustion pressure fluctuation amount COV.

Figure 3:
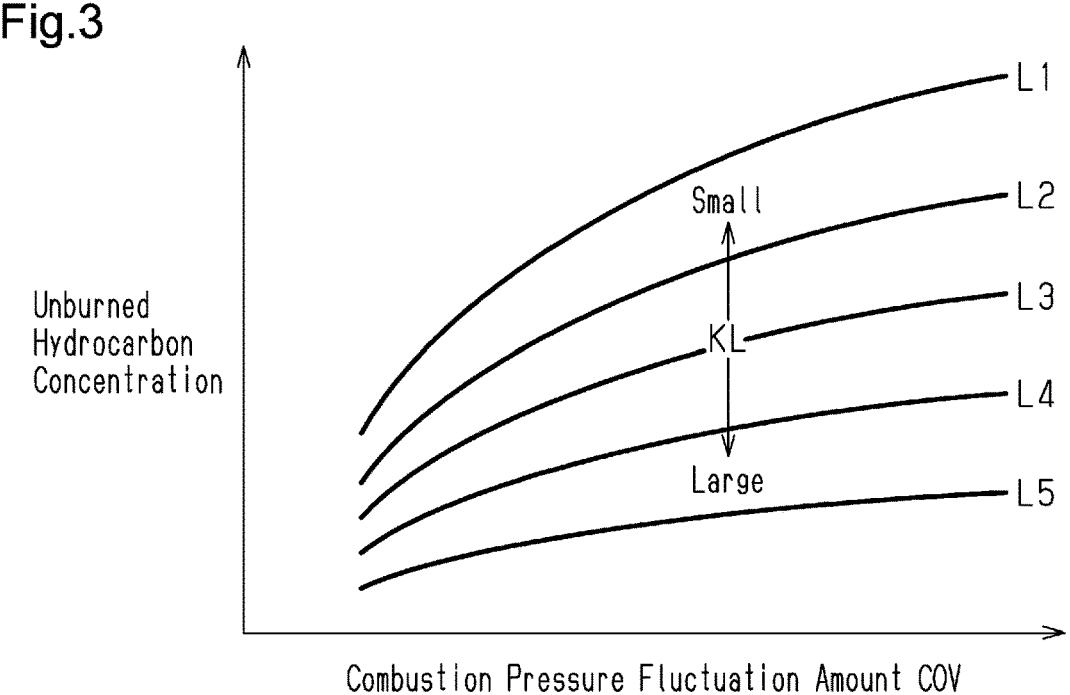
FIG. 3 is a graph showing the relationship between the combustion pressure fluctuation amount, the engine load factor, and the unburned hydrogen concentration.

FIG. 3 shows the relationship between the unburned hydrogen concentration calculated in step S120 of FIG. 2 and the combustion pressure fluctuation amount COV and the engine load factor KL used for the calculation. When a part of the hydrogen gas injected by the injector 16 remains unburned, the combustion pressure becomes lower than that when all of the hydrogen gas is burned. Thus, when incomplete combustion occurs intermittently and unburned hydrogen is discharged to the exhaust passage 13, the combustion pressure fluctuation amount COV becomes large. Thus, in the case where the engine load factor KL is constant as shown in FIG. 3, the ECU 21 calculates, as the value of unburned hydrogen concentration, a larger value than when the combustion pressure fluctuation amount COV is relatively small than when the combustion pressure fluctuation amount COV is relatively large. Further, if the combustion pressure fluctuation amount COV is constant, the unburned hydrogen concentration tends to increase as the engine load factor KL decreases. Thus, as shown in FIG. 3, when the engine load factor KL is relatively small, the ECU 21 calculates a value (as the value of the unburned hydrogen concentration) that is relatively larger than when the engine load factor KL is relatively large.

FIG. 4 shows the relationship between the lean correction amount Δ calculated in step S130 of FIG. 2 and the unburned hydrogen concentration. The output of the air-fuel ratio sensor 20 deviates to the rich side the higher the concentration of unburned hydrogen in the exhaust gas. Thus, as shown in FIG. 4, the ECU 21 calculates, as the value of the lean correction amount Δ, a value that is relatively larger when the concentration is high than when the concentration is low. Thus, by correcting the air-fuel ratio sensor value λs by the lean correction amount Δ, it is possible to appropriately compensate for the rich deviation of the output of the air-fuel ratio sensor 20 due to the unburned hydrogen in the exhaust gas.

The controller for the hydrogen engine 10 of the present embodiment described above provides the following advantages.

(1) The ECU 21 in the controller of the present embodiment includes the processing circuitry 23, which executes the following two processes. One of the processes is a process that calculates the combustion pressure fluctuation amount COV based on the output of the in-cylinder pressure sensor 18. The other process is a process that calculates the lean correction amount Δ, which is used to correct the rich deviation of the output of the air-fuel ratio sensor 20 due to unburned hydrogen in the exhaust gas, based on the combustion pressure fluctuation amount COV. By executing these processes, the controller of the present embodiment properly compensates for the deviation of the output of the air-fuel ratio sensor 20 due to unburned hydrogen.

(2) Since the air-fuel ratio λ can be accurately acquired by the above-described compensation, the air-fuel ratio control can be accurately performed.

(3) The processing circuitry 23 of the ECU 21 calculates the lean correction amount Δ such that the ratio of the absolute value of the lean correction amount Δ to the combustion pressure fluctuation amount COV is larger when the engine load factor KL is relatively small than when the engine load factor KL is relatively large. Thus, if the combustion pressure fluctuation amount COV is constant, an appropriate value matching the tendency of the hydrogen engine 10 in which the unburned hydrogen concentration increases as the engine load factor KL decreases can be calculated as the value of the lean correction amount Δ.

(4) The processing circuitry 23 of the ECU 21 calculates the lean correction amount Δ when the fluctuation of the NOx concentration is less than or equal to the predetermined value. If the lean correction amount Δ is calculated based on the combustion pressure fluctuation amount COV when the actual air-fuel ratio λ fluctuates, the influence of the fluctuation of the air-fuel ratio λ is reflected in the lean correction amount Δ. On the other hand, when the air-fuel ratio λ fluctuates, the NOx concentration of the exhaust gas also fluctuates. Thus, if the lean correction amount Δ is calculated when the fluctuation of the NOx concentration is small, the influence of the fluctuation of the air-fuel ratio λ is less likely to be reflected in the lean correction amount Δ. Thus, it is possible to accurately compensate for the output deviation of the air-fuel ratio sensor 20 due to the influence of the unburned hydrogen.

Modifications

The present embodiment may be modified as follows. The present embodiment and the following modifications can be combined as long as they remain technically consistent with each other.

In the above embodiment, the ratio of the variance to the average value of the indicated mean effective pressure is calculated as the value of the combustion pressure fluctuation amount COV. Based on the output of the in-cylinder pressure sensor 18, another value indicating the magnitude of the fluctuation in the combustion pressure may be calculated as the value of the combustion pressure fluctuation amount COV. For example, instead of the indicated mean effective pressure, the peak value of the internal pressure of the combustion chamber 12 in each combustion cycle may be obtained, and the difference between the maximum value and the minimum value of the peak value in a certain combustion cycle may be calculated as the value of the combustion pressure fluctuation amount COV.

In the above embodiment, the condition for calculating the lean correction amount Δ based on the combustion pressure fluctuation amount COV is that the engine speed NE and the NOx concentration are stable. Such calculation conditions may be changed as appropriate.

In step S120 of FIG. 2, the engine load factor KL may not be used for the estimation of the concentration.

In the compensation routine of FIG. 2, after the unburned hydrogen concentration is estimated from the combustion pressure fluctuation amount COV, the lean correction amount Δ is calculated based on the unburned hydrogen concentration. The lean correction amount Δ may be calculated directly from the combustion pressure fluctuation amount COV without calculating the unburned hydrogen concentration.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All fluctuations within the scope of the claims and their equivalents are included in the disclosure.

What is claimed is:

1. A controller for a hydrogen engine configured to operate using hydrogen gas as fuel, the hydrogen engine including an in-cylinder pressure sensor and an air-fuel ratio sensor, the controller comprising processing circuitry configured to execute:

a process that calculates a fluctuation amount of a combustion pressure based on an output of the in-cylinder pressure sensor; and a process that calculates a correction amount based on the fluctuation amount, the correction amount being used to correct a rich deviation of an output of the air-fuel ratio sensor due to unburned hydrogen as the fuel in exhaust gas.

2. The controller according to claim 1, wherein the processing circuitry is configured to calculate the correction amount such that a ratio of an absolute value of the correction amount to the fluctuation amount is larger when a load factor of the hydrogen engine is relatively small than when the load factor is relatively large.

3. The controller according to claim 1, wherein the hydrogen engine further includes a NOx sensor that detects a NOx concentration in the exhaust gas, and the processing circuitry is configured to calculate the correction amount when the NOx concentration is stable such that a fluctuation in the NOx concentration is less than or equal to a predetermined value.

4. The controller according to claim 1, wherein the processing circuitry is configured to calculate the correction amount when both the NOx concentration and an engine speed are stable such that a fluctuation in the NOx concentration is less than or equal to a first predetermined value; and a fluctuation in the engine speed is less than or equal to a second predetermined value.

* * * * *